(12) United States Patent
Nishikawa et al.

(10) Patent No.: US 6,752,677 B2
(45) Date of Patent: Jun. 22, 2004

(54) METHOD FOR PRODUCING SPARK PLUG

(75) Inventors: Kenichi Nishikawa, Bisai (JP); Makoto Sugimoto, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 151 days.

(21) Appl. No.: 10/135,845

(22) Filed: May 1, 2002

(65) Prior Publication Data

US 2003/0082982 A1 May 1, 2003

(30) Foreign Application Priority Data

May 2, 2001 (JP) ..................................... P.2001-135496

(51) Int. Cl.$^7$ .......................... H01T 13/38; H01T 21/02
(52) U.S. Cl. ............................. 445/7; 501/14; 501/21
(58) Field of Search ................. 445/7; 501/14, 501/21

(56) References Cited

U.S. PATENT DOCUMENTS

| | | | |
|---|---|---|---|
| 4,084,976 A | * | 4/1978 | Hinton |
| 4,120,733 A | * | 10/1978 | Knapp |
| 4,246,040 A | * | 1/1981 | Okumura et al. ........... 106/444 |
| 4,256,497 A | * | 3/1981 | Knapp |
| 5,001,109 A | * | 3/1991 | Spencer ...................... 505/441 |
| 5,034,358 A | * | 7/1991 | MacMillan ................. 501/106 |
| 5,677,250 A | * | 10/1997 | Knapp |
| 5,738,718 A | * | 4/1998 | Mori et al. ................. 106/481 |
| 5,856,015 A | * | 1/1999 | Buchanan ................... 428/426 |
| 5,916,635 A | * | 6/1999 | Ishii et al. ............... 427/388.2 |
| 6,274,971 B1 | * | 8/2001 | Sugimoto et al. |
| 6,492,289 B1 | * | 12/2002 | Suzuki et al. |

FOREIGN PATENT DOCUMENTS

| | | | |
|---|---|---|---|
| JP | A 10-236845 | * | 9/1998 |
| JP | A 11-43351 | * | 2/1999 |
| JP | A 11-106234 | * | 4/1999 |
| JP | A 2000-48931 | * | 2/2000 |
| JP | A 2000-313681 | * | 11/2000 |
| JP | A 2001-39733 | * | 2/2001 |

OTHER PUBLICATIONS

"Surface Roughness–Definitions and Designation", Japanese Industrial Standard, JIS B 0601, Jan. 20, 2001 (with English language 1994 version).

* cited by examiner

Primary Examiner—Kenneth J. Ramsey
(74) Attorney, Agent, or Firm—Morgan, Lewis & Bockius LLP

(57) ABSTRACT

A method for producing a spark plug, the spark plug comprising a center electrode, a metal shell and an alumina ceramic insulator disposed between the center electrode and the metal shell, wherein at least part of the surface of the insulator is covered with a glaze layer comprising oxides, the method comprising the steps of: preparing a coated glaze powder so that a surface of each particle of a glaze powder is covered by an elution-suppressing coating layer, the elution-suppressing coating layer suppressing an elution of water soluble component that is contained in each particle of the glaze powder; preparing a glaze slurry by suspending the glaze powder in a water solvent; applying the glaze slurry to a surface of the insulator so as to form a glaze powder-deposited layer; and baking the glaze powder-deposited layer to the surface of the insulator to form the glaze layer by heating the glaze powder-deposited layer.

26 Claims, 9 Drawing Sheets

FIG. 12a
FIG. 12b
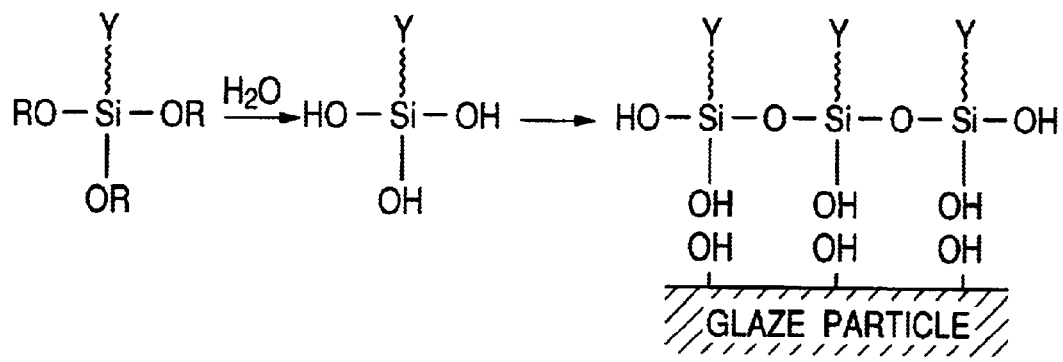
FIG. 12d
FIG. 12c
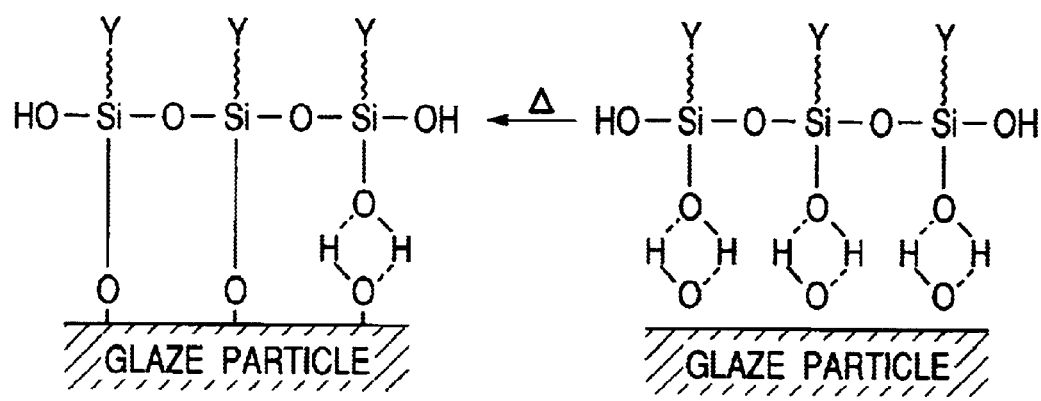

EACH OF n INDEPENDENTLY REPRESENTS AN INTEGER

METHOD FOR PRODUCING SPARK PLUG

FIELD OF THE INVENTION

The present invention relates to a method of producing a spark plug.

BACKGROUND OF THE INVENTION

A spark plug used to ignition of an internal engine of such as an automobile generally comprises an insulator made of alumina based ceramics disposed inside of a metal shell to which an earth electrode is fixed, and a center electrode disposed within the insulator. The insulator is axially projected out of a rear opening side of the metal shell, and has a terminal metal fixture disposed in the interior of the projected portion, which terminal metal fixture is connected to the center electrode through a resistor or a conductive glass seal layer which is formed in a glass sealing procedure. Thus, by supplying a high voltage through the terminal metal fixture, a spark is produced over a gap between the earth electrode and the center electrode.

However, under some combined conditions that, for example, temperature of the spark plug is high and environmental moisture becomes high, even a high voltage supplied fails to cause the spark over the gap, but instead, a so-called flashover occurs, that is, a discharge occurs between the terminal metal fixture and the metal shell as running around the projected portion of the insulator. Therefore, almost all of generally used spark plugs have a glaze layer formed on the surface thereof for preventing the flashover phenomenon. On the other hand, the glaze layer also serves to smoothen the surface of the insulator, prevent contamination or increase chemical and mechanical strength.

In case of glazing over spark plugs which are attached to engines, the glaze temperature becomes higher than that of a normally insulating porcelain. Further, in recent years, being accompanied with high performance of engines, ignition voltage supplied to the spark plug has been high, and the glaze has been demanded to have an insulating property endurable against severe environments.

On the other hand, in general as to automobile engines, a rubber cap is utilized to attach the spark plug to the electric system of engines. In order to heighten the flashover resistance, adhesion between the insulator and the interior of the rubber cap is important. In this case, it is required that the glaze layer to be formed on the surface of the insulator is generally free of unevenness and is smooth to the utmost.

For forming the glaze layer on the surface of the insulator, the following procedures are generally adopted. At first, glaze materials are mixed to be a predetermined composition, and then the composition is melted by use of a crucible, and is rapidly cooled for solidification to be a vitreous glaze composition. The glaze composition is finely pulverized by means of a ball mill, and is finally reduced into a glaze slurry of glaze particles suspended in a water solvent. The glaze slurry is coated to the surface of the insulator by way of spraying, spin coating or dipping, and is dried, followed by a glaze baking treatment.

Herein, in case of obtaining a glaze layer of little unevenness in thickness, it is significant that the glaze slurry has fluidity. The slurry of good fluidity spreads well by coating over the surface of the insulator and easily brings about the glaze layer of smooth and uniform thickness. On the other hand, a slurry of bad fluidity will be biased on the surface of the insulator and will result in a coat of uneven thickness.

SUMMARY OF THE INVENTION

The glaze for spark plugs contains $SiO_2$ (silicon oxide) as an indispensable component for forming a vitreous skeleton, and for properly lowering the glaze baking temperature so as to enhance the fluidity while melting, the glaze generally comprises a silicate glass mixed with various sub-components such as boric acid ($B_2O_3$), alkaline metal components ($Li_2O$, $Na_2O$, or $K_2O$), or alkaline earth metal components (MgO, CaO, SrO, or BaO). Among the components, $SiO_2$ itself has scarcely problem because of low solubility to a water. However, some of the mixed sub-components may be of comparatively high solubility. (hereinafter referred to as called "water soluble glaze component") The representative ones are alkaline metal oxides ($Li_2O$, $Na_2O$, $K_2O$), or boric acid ($B_2O_3$).

In case of using the glaze of a high containing rate of these components, when wet-pulverizing the glaze with the water solvent, or storing it under a state of the water solvent slurry, the water soluble solvent glaze components gradually elute into the solvent. This elution gives changes to a rheology of the slurry suspending the glaze particles, so that viscosity of the slurry increases as a time passes, and the fluidity of the slurry is spoiled to easily make the above mentioned problem the uneven thickness in the coating. For example, even at an elution level which is almost a matter of no problem under a condition of the glaze layer after baking tho glaze, but if the slurry is reduced into a fine powder (average diameter is, for example, around 5 to 45 $\mu$m) which can be suspended as the slurry, the influence of elution is especially difficult to be neglected.

In case of the alumina insulator for spark plugs, a lead silicate vitreous glaze was conventionally used where the silicate glass was mixed with a comparatively much amount of PbO to lower the softening point. However, with the global concern of environment protection having grown up in the recent years, the glaze containing Pb has progressively come to be out of consideration. For example, in the automobile industry using many spark plugs, considering adverse influences to environment by waste spark plugs, an investigation has been progressed to abolish use of spark plugs using Pb containing glaze in a future. However, when planning leadless spark plugs, it is unavoidable to use an increased amount of alkaline metal component or boric acid component for the purpose of restraining the rise of melting point which is caused by elimination of the lead component. As a result, the viscosity of slurry inevitably increases as the time-passing as a problem particular in consideration of the leadless glaze.

The problem of the invention is to effectively avoid the uneven glaze coat on the surface of the insulator owing to tho viscosity rising in the glaze slurry, and in turn it is an object of the invention to provide a method of easily producing a spark plug excellent in flashover resistance.

The invention has been provided to solve the problems as mentioned above, and relates to a method of producing a spark plug, wherein an insulator of alumina based ceramics is disposed between a center electrode and a metal shell, and a glaze layer as a main of oxide is formed to cover at least part of the insulator, characterized by the steps of preparing glaze particles to be coated, respective surfaces of which are covered with coating layers for suppressing (restraining) elution of water soluble components contained in the glaze, preparing a glaze slurry by suspending the glaze particles to be coated in a water solvent, piling the glaze particles for forming a glaze particle piled layer by coating the glaze slurry to the surface of the insulator, and baking the glaze particle piled layer to the surface of the insulator by heating the insulator to form the glaze layer.

According to the invention, prior to suspending the glaze particle in the water solvent to make a slurry, the surface of glaze particle was covered with a coating layer for suppressing elution of the water soluble components contained in the glaze, thereby to obtain a glaze particle to be coated which is used to prepare a slurry, so that the water soluble components in the glaze (for example, B, F, Li, K, Na) do not easily elute into the water solvent in the slurry, and the inconvenience that the slurry viscosity rises as the time-passing may be effectively restrained. As a result, when coating the glaze slurry to the insulator, a proper coat thickness may be easily obtained, and dispersion in the coated thickness is little. Thus, the proper thickness of the glaze layer formed by the glaze-baking and reduction of dispersion in the thickness may be effectively attained. Namely, it is possible to easily produce the spark plug having the smooth and uniform glaze coat, and in turn excellent in the flashover resistance.

The effect of forming the elution-suppressing coating layer is remarkably exhibited when the glaze contains a total amount of 30 to 60 mol % of one or two or more sorts selected from a group of water soluble components of B, P, Li, K and Na in terms of $B_2O_5$, $P_2O_5$, $Li_2O$, $K_2O$, $Na_2$ respectively. The adoption of such glaze composition is required particularly in case of obtaining the glaze containing 1 mol % or less of Pb in terms of PbO (hereinafter referred to as "leadless glaze") by way of the glaze-baking at a temperature almost the same as the range of conventional glaze baking temperature (900 to 1100° C.) Because if the Pb containing amount is less than 1 mol % and in case the amount of the water soluble component is less than 30 mol %, the glaze baking temperature undesirably becomes too high, and if exceeding 60 mol %, the water resistance of the glaze layer itself after the glaze-baking (in case of the alkaline metal component, voltage resistance in addition to the alkaline metal component) is not be sufficiently secured.

Next, the insulator of generally available spark plugs has a projection radially extending from the outer periphery at the middle portion in the axial direction thereof, and it has also a forward portion extending toward a forward end of a center electrode in the axial direction, and further has a base portion of a body portion adjacent the projection at the rear side thereof, the base portion having an outer periphery formed as a cylinder. The glaze layer is formed in a manner of covering the outer periphery of the base portion, For enhancing the flashover resistance, the maximum height Ry is preferably 10 μm or less and smooth in view of the surface roughness curve measured at the outer periphery of the base portion in accordance to the method as prescribed by JIS:B0601. The spark plug producing method of the invention is effective for obtaining such a smooth graze layer. In case the maximum height Ry is more than 10 μm in view of the surface roughness curve measured at the outer periphery of the base portion, the leadless glaze layer of the above mentioned glaze composition fails to form the smooth and uniform glaze baking surface, and the close contact between the glaze baked surface and-the rubber cap is spoiled to make the. flashover resistance. The maximum height Ry is preferred if being smallest possible in view of the close contact and the flashover resistance. However, if excessively reducing the maximum height Ry, it leads to a cost-up. It is, therefore, required to seek the maximum height Ry within a range of not causing any problem (for example, Ry≧0, 0.5 μm). More preferably, the maximum height Ry is 1 to 4 μm. Incidentally, the values of Ry is obtained in a manner that a reference length is picked out, in the direction of an average line, from a roughness curve measured with an evaluating length decided by JIS:B0601 (1994), and the space between the peak line and the bottom line of the picked out portion is measured in a vertical magnification direction of the roughness curve, and the values are indicated in micrometers (μm) Selection of the evaluated length and the reference length is as prescribed by 4, 1, 3 of JIS:B0601.

Further, it is preferable that the film thickness of the glaze layer covering the outer periphery of the base portion of the body portion is 10 to 50 μm. According to the study by the inventors, it was found out that as to borosilicate glass based- or alkaline borosilicate glass based leadless glaze layer, adjustment of the film thickness of the glaze layer is significant in obtaining the smooth surface of the glaze layer. Further, it was found out that since the outer periphery of the base portion of the body portion of the insulator is required to closely contact the rubber cap, the adjustment of film thickness, if properly conducted, will increase the flashover resistance. In case the film thickness of the glaze layer the ranges 10 to 50 μm, the close contact may be obtained between the glaze baked surface and the rubber cap without lowering the insulating property of the glaze layer, and additionally the flashover resistance may be obtained.

In case the thickness of the glaze layer in the insulator is less than 10 μm, it is difficult to form a uniform and smooth glaze baked surface in the leadless glaze layer of the above mentioned composition (however, excepting that the outer periphery of the base part of the insulator is smoothed by means of barrel polishing). On the other hand, in case the thickness of glaze layer exceeds 50 μm, the insulating property in the leadless glaze layer of the mentioned composition is lowered, simultaneously resulting in lowering of the flashover resistance. Further, in case the insulator is glazed as it stands, the glaze sags when coating the glaze slurry or baking the glaze, and the film will become thicker as it goes down, causing difficulty to attach the cap. More preferably, the thickness of the glaze layer is 10 to 30 μm.

Explanatory views showing the steps for producing a glaze slurry in the spark plug production method of the invention;

[FIG. 2]

An explanatory view showing a first modified example of the coating process;

[FIG. 3]

An explanatory view showing a second modified example of the coating process;

[FIG. 4]

Figure 5A:
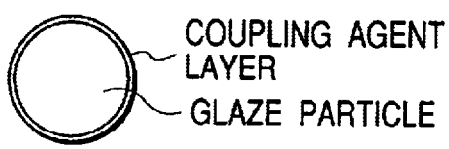
Figure 5C:
Figure 5B:
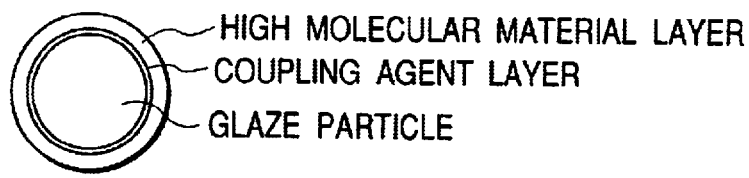

An explanatory view showing a third modified example of the coating process;

[FIG. 5 (FIGS. 5a to 5c)]

Explanatory views schematically showing the various structures of particles of a coated glaze powder;

[FIG. 6]

Explanatory views showing the coating processes by use of a coating agent of two fluid mixing type;

[FIG. 7]

An explanatory view showing a coating process by use of a silane coupling agent;

[FIG. 8]

Explanatory views showing the processes of making a coated glaze powder into a slurry;

[FIG. 9]

An explanatory view showing a process for coating an insulator with a glaze slurry;

[FIG. 10]

An explanatory view showing the appearance of the insulator after glaze baking;

[FIG. 11]

A spark plug which may be produced by the invention, shown in vertical section by way of example;

[FIG. 12 (FIGS. 12a to 12d)]

Explanatory views showing the actions of silane coupling agent; and

[FIG. 13]

Explanatory views showing plural types of silicon containing polymers.

[FIG. 14]

Explanatory views showing four sort units of polysiloxane.

DETAILED DESCRIPTION OF THE INVENTION

Figure 11:
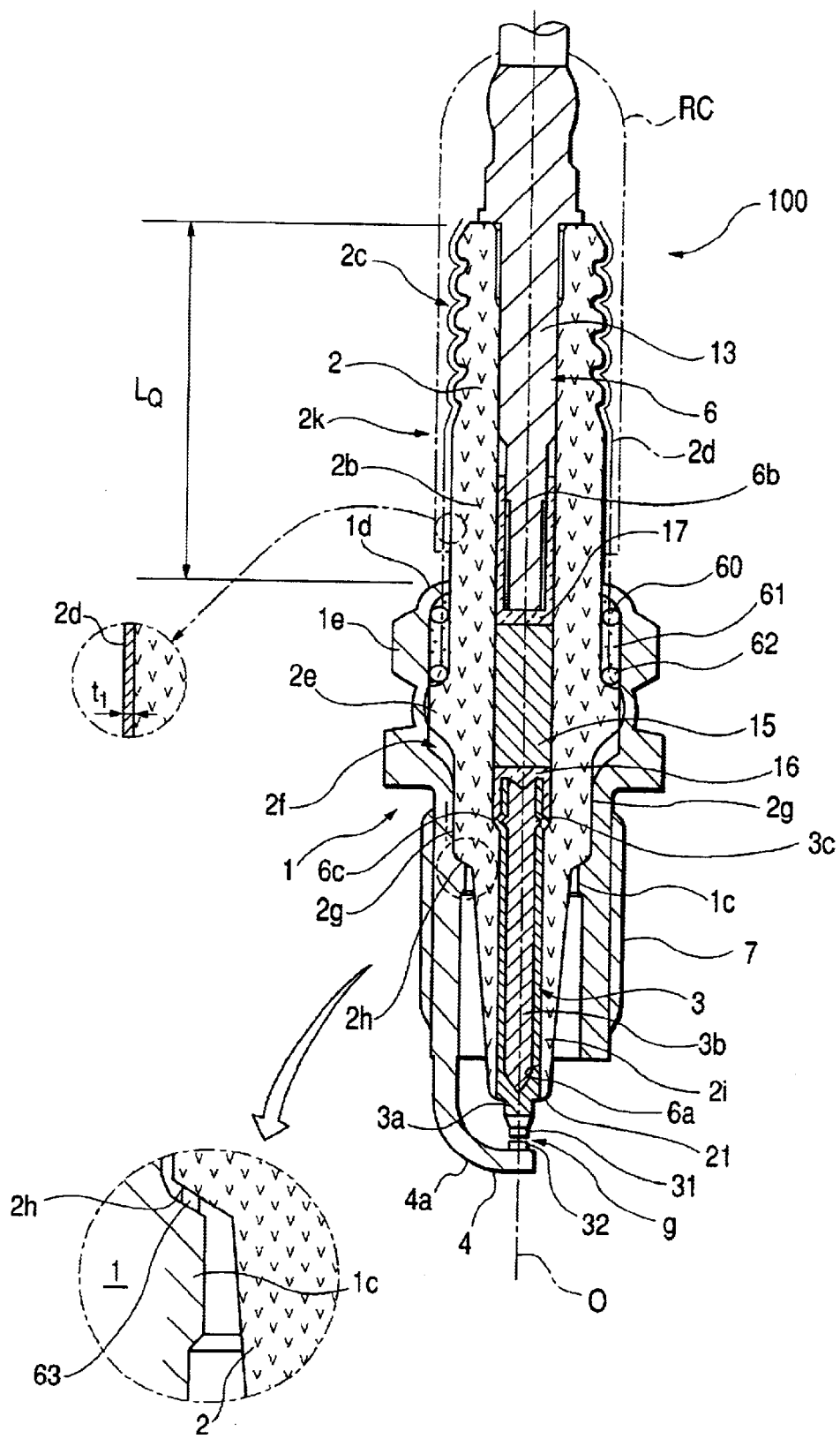

A mode for carrying the invention will be described in reference to an embodiment as shown in the attached drawings. FIG. 11 shows a spark plug by way of example as an object of the invention. The spark plug 100 comprises a cylindrical metal shell 1, an insulator 2 fitted at the inside of the metal shell 1 and having a distal end 21 protruded out of the metal shell 1, a center electrode 3 arranged inside of the insulator 2 and having a distal end formed with an igniting portion 31 of a precious metal, and an earth electrode 4 having one end connected to the metal shell 1 by way of welding and having the other end which is bent in the direction opposite to the one end so as to have a side thereof located opposite to the distal end of the center electrode 3. Further, the earth electrode 4 has an igniting portion 32 so as to be opposite to the igniting portion 31 of the center electrode 3, so that a spark discharging gap g may be provided between the two igniting portions.

The metal shell 1 is made of a metal of low carbon steel in a shape of cylinder as a housing of the spark plug 100 having an outer periphery formed with a screw portion 7 and a hexagonal portion 1e by which the spark plug 100 is attached to an engine block (not shown).

The insulator 2 has a through-hole 6 formed axially in the same. A terminal metal fixture 13 is inserted into the through-hole 6 at one end thereof and fixed thereto while the center electrode 3 is inserted into the through-hole 6 at the opposite end thereof and fixed thereto. Further, in the through-hole 6, there is provided a resistor 15 between the terminal metal fixture 13 and the center electrode 3. The resistor 15 has the opposite ends electrically connected to the center electrode 3 and to the terminal metal fixture 13 by means of conductive glass seal layers 16, 17 respectively.

The insulator 2 has the through-hole 6 formed axially of the same for fittingly receiving the center electrode 3 and is generally of a sintered ceramics. The insulator 2 has a projection 2e formed at the axially central portion as radially extending out from the outer periphery thereof, for example, in a shape of flange. The insulator 2 has a forward portion extending toward the forward end of the center electrode 3 and a rearward portion extending from the projection 2e in the direction opposite to the forward end of the center electrode 3. The rearward portion is formed as a body portion 2b of the insulator 2 and has a diameter smaller than the projection 2e. On the other hand, the forward portion extending from the projection 2e is formed with a first front portion 2g of a diameter which is smaller than the projection 2e and is formed with a second front portion 2i of a diameter which is smaller than the first front portion 2g. Incidentally, the body portion 2b has a rear end portion of outer periphery which is generally cylindrical instead of being corrugated. Further, the first front portion 2g is of a generally cylindrical periphery and the second front portion 2i is generally conical with the peripheral area being progressively reduced as it goes to the distal end.

The center electrode 3 has a sectioned surface which is smaller than the sectioned surface of the resistor 15. The through-hole 6 of the insulator 2 has a first cylindrical portion 6a for receiving the center electrode 3 and a second cylindrical portion 6b of a diameter which is larger than that of the first cylindrical portion 6a, the second cylindrical portion 6b being located at the rear side (upper side in the Figure). The terminal metal fixture 13 and the resistor 15 are arranged in the second portion 6b and the center electrode 3 is arranged in the first portion 6a. The center electrode 3 has a protruding portion 3c formed at the rear end portion thereof as outwardly extending from the outer periphery thereof for fixedly positioning the center electrode 3. The first portion 6a and the second portion 6b are connected as being conductive with each other in the first front portion 2g. The connected portion has a portion 6c of a tapered or R surface formed for receiving the protruding portion 3c of the center electrode 3.

The insulator 2 is prevented from being pulled out of the metal shell 1 because a portion 2h connecting the first front portion 2g and the second front portion 2i has a stepped outer periphery which is in engagement with an inner radial projection 1c of the metal shell 1 through a gasket ring 63. On the other hand, a ring shaped line packing 62 is provided between an inner surface of a rear opening of the metal shell 1 and the outer periphery of the insulator 2, the ring shaped line packing 62 being in engagement with a rear side periphery of the flange like projection 2e. At the further rear side, a ring shaped line packing 60 is provided through a filler layer 61 including talc or the like. The metal shell 1 is fixedly connected to the insulator 2 by pushing the insulator 2 in the front side direction into the metal shell 1 and then by press-fitting the opening periphery of the metal shell 1 toward the packing 60 to form a press-fitting portion 1d.

Next, as shown by the one-dotted chain line in FIG. 11, the outer surface of the insulator 2, specifically the outer periphery of the body portion 2b has a glaze layer 2d formed thereat. The glaze layer 2d is required to have a smoothness with the maximum height Ry being 10 μm or less in view of the surface roughness curve measured at the base portion of the body portion 2b in accordance with the method prescribed by JIS:B0601. Further, the thickness is required to be 10 to 150 μm, preferably 10 to 50 μm.

The glaze layer 2d is mainly formed with oxides. For example, the following compositions may be employed:

The amount of Pb component is 1 mol % or less in terms of PbO;

35 to 80 mol % of a first component comprising 5 to 60 mol % of Si component in terms of $SiO_2$ and 3 to 50 mol % of B component in terms of $B_2O_3$; and a second component comprising at least one of Zn component and alkaline earth metal component R (in this case, K is one or two or more sorts selected from Ca, Sr, Ba), wherein a total of 5 to 60 mol % of Zn in terms of ZnO and R in terms of RO composition formula is contained, and a total of 65 to 98 mol % of the first and second components is contained; and further, as the alkaline component, a total of 2 to 15 mol % of one or two or more sorts of Na, K, Li is contained in terms of $Na_2O$, $K_2O$, $Li_2O$ respectively. Further, in order to realize a leadless glaze containing Pb 1 mol % or less in terms of PbO, a total of 30 to 60 mol % of one or two or more sorts is contained selected from a group of water soluble components including B, P, Li, K and Na in terms of $B_2O_5$, $P_2O_5$, $Li_2O$, $K_2O$ and $Na_2O$ respectively.

If $SiO_2$ is less than 5 mol %, it is difficult to vitrify the glaze layer 2d, and a uniform glaze layer 2d is not formed. On the other hand, if Si is more than 60 mol %, a softening point of the glaze will rise and the glaze-baking becomes difficult or impossible. Further, it is preferable that B is set to 3 to 50 mol % by weight in terms of $B_2O_3$. If B is less than 3 mol %, the softening point of the glaze rises and the glaze-baking becomes difficult or impossible. On the other hand, if B is more than 50 mol %, there may be caused inconveniences of devitrification of the glaze layer 2d, reduction of insulating property or inconformity of heat expansion coefficient with the substrate.

The total amount of the second component comprising the Zn component and/or the alkaline earth metal component R (in this case, R is one or two or more sorts selected from Ca, Sr, Ba) is preferably set to 5 to 60 mol % in terms of ZnO and RO composition formula respectively. If the second component is less than 5 mol %, the softening point of the glaze will rise and the glaze baking might be ineffective at a predetermined temperature. Further, the heat expansion coefficient of the glaze layer 2d might be excessively high to cause crazing in the glaze layer 2d. On the other hand, if the second component exceeds 60 mol %, there may be caused the devitrification in the glaze layer 2d. Further, the insulating property of the glaze layer 2d maybe insufficient to reduce the flashover resistance.

Further, it is preferable that the total amount of the first and second components is set to 65 to 98 mol % in terms of oxide. If exceeding 98 mol %, the softening point of the glaze may rise to probably make the glaze baking ineffective. Further, if being less than 65 mol %, it becomes difficult to make compatible the insulating property, the softening point and the adjustment of heat expansion coefficient. Incidentally, it is preferable that the total amount is desirably 70 to 95 mol %.

The alkaline metal component in the glaze later 2d acts to lower the softening point of the glaze. It is preferable that the total amount of the alkaline metal component is 2 to 15 mol % in Na, K, Li in terms of Na2O, K2O, Li2O respectively. If being less than 2 mol %, the softening point rises to probably make the glaze baking ineffective. On the contrary, if exceeding 15 mol %, the insulating property of the glaze layer 2d is lowered to spoil the flashover resistance. It is preferable that the total amount of the alkaline component is 3 to 15 mol %.

As to the alkaline metal component, it is effective to prevent the reduction of the insulating property of the glaze layer 2d by adding together the two sorts selected from Na, K, Li instead of adding a single sort of alkaline metal component. As a result, the amount of alkaline metal component may be increased without reducing the insulating property. Consequently, the two objects of security of flashover resistance and reduction of the glaze-baking temperature may be simultaneously attained. Incidentally, other alkaline metal components may be added in a range that the effect of restraining the conductivity obtained by way of adding together the alkaline metal components is not decreased. Incidentally, in order to prevent the reduction of the insulating property, it is preferable that the addition amount of each alkaline metal component is 5 mol % or less. Particularly, it is preferable that the three components Na, K and Li are all added.

Further, it is preferable that the glaze layer 2d contains Li component as an alkaline metal component. Of the alkaline metal components, Li component has an effect to reduce the surface expansion while the glaze baking to improve the smoothness and to reduce the surface roughness. Further, Li component is preferred to be contained in order to secure the effect of adding a plurality of alkaline metal components for increasing the insulating property, and in order to secure the adjustment of heat expansion coefficient and further to increase the mechanical strength of the glaze layer 2d. It is preferable that Li component is contained in the amount in mol as converted in oxide and in the following region:

$$0.2 \leq Li/(Na+K+Li) \leq 0.5$$

If the rate of Li is less than 0.2, the heat expansion coefficient becomes too large as compared with the alumina substrate. As a result, the crazing may be easily produced to make the finished glaze baking surface insufficient. On the other hand, if the rate of Li component exceeds 0.5, this may give an adverse influence to the insulating property of the glaze layer 2d because the Li ion is of a comparatively high degree of immigration among the alkaline metal ions. It is preferable that the value of Li/(Na+K+Li) is adjusted in the range of 0.3 to 0.45.

Further, the glaze layer 2d may contain, besides the components as mentioned above, a total amount of 0.5 to 30 mol % of one or two or more sorts of 0.5 to 10 mol % of Al component in terms of $Al_2O_3$, 0.5 to 10 mol % of Ca component in terms of CaO and 0.5 to 30 mol % of Sr component in terms of SrO. Al component has an effect to prevent the glaze layer 2d from devitrification, Ca and Sr components have an effect to increase the insulating property of the glaze layer 2d. In case the adding amount of each component is less than the lower limit, the effect is little. In case the addition amount of each component exceeds the upper limit or the upper limit of the total containing amount, the glaze softening point will excessively rise and the glaze-baking will be difficult or ineffective.

The glaze layer 2d may contain in a range of a total amount 0.5 to 5 mol % of one or two or more sorts of Mo, Fe, W, Ni, Co, Mn in terms of $MoO_3$, $Fe_2O_3$, $WO_3$, $Ni_3O_4$, $Co_3O_4$, $MnO_2$ respectively. With the containing amount, the fluidity at the glaze-baking will be remarkably enhanced, and in turn, the glaze-baking may be performed with a comparatively low temperature to more easily obtain the glaze layer 2d excellent in the insulating property and smooth in the glaze baked surface.

If the total amount of one or two or more sorts of Mo, Fe, W, Ni, Co and Mn (hereinafter referred to as "fluidity-improving transition metal component") contained in the glaze layer 2d is less than 0.5 mol % in terms of oxide, the fluidity-improving effect when glaze-baking is insufficient for attaining the smooth surface of the glaze layer 2d. On the other hand, if exceeding 5 mol %, the glaze softening point excessively rises, and the glaze-baking is difficult or ineffective. As a problem in case the fluidity-improving transition metal components are excessively contained, the glaze layer 2d may have an unexpected tint.

By the way, the component for particularly making remarkable the fluidity-improving effect is in the order of MO, Fe and W. It is, therefore, possible to decide, for example, Mo, Fe or W as the component for obtaining the fluidity improving effect. Further, it is preferable that 50 mol % or more of the fluidity-improving transition metal component is Mo in order to enhance the fluidity-improving effect at the time of glaze baking. As Fe component source of the material for the glaze layer 2d, any of Fe (II) ion system (for example, FeO) and Fe (III) ion system (for example, $Fe_2O_3$) may be available. However, the containing amount of Fe in the final glaze layer 2d is indicated in terms of $Fe_2O_3$ irrespective of the Fe ionic value.

Further, a total amount 0.5 to 5 mol % of one or two or more sorts of Zr, Ti, Hf, Mg, Bi, Sn, Sb, and P may be contained in terms of $ZrO_2$, $TiO_2$, MgO, $Bi_2O_3$, $SnO_2$, $Sb_2O_5$, $P_2O_5$ respectively. These components may be positively added in accordance with the object to be attained, or maybe inevitably mixed as impurities (or contaminations) from such as fire resistant elements in raw materials (or clay mineral added when preparing the glaze slurry as described later) and in the fusing process.

These components may be optionally added for adjusting the glaze softening temperature (for example, $Bi_2O_3$, $ZrO_2$, $TiO_2$, $HfO_2$), enhancing the insulating property (for example, $ZrO_2$ or MgO) or adjusting the tint. Further, by mixture of Ti, Zr or Hf, water resistance maybe improved. Zr or Hf component is more remarkably effective for improving the water resistance of rgw glaze layer 2d in comparison with the Ti component. Further, by addition of these components, the water soluble component may be prevented from elution when the glaze slurry is left for a long time. Thus, the problems of the invention may be solved at a higher level. Further, Sb or Bi increase the fluidity at the glaze-baking, restrain the formation of bubbles in the glaze agent layer 2d, or cover the matters attached to the glaze baking surface when flowing, thereby to prevent the attached matters from producing abnormal projections.

The spark plug 100 may be produced, for example, in the following procedure. At first, the insulator 2 is formed as a molding substrate body., where, as raw material powders, alumina power and component powder of Si, Ca, Mg, Ba and B are baked and then mixed at a predetermined rate so as to obtain the aforementioned composition in terms of oxide, and the mixed powder is added with a binder (for example, PVA) and a water of predetermined amounts to form a base molding granule which is baked at temperature 1400 to 1600° C. to form the insulator 2d.

On the other hand, the glaze may be prepared in the following procedure.

Firstly, the component powders (for example, Si component is $SiO_2$ powder, Al component is $Al_2O_3$ powder, B component is $H_3BO3$ powder, Zn component is ZnO powder, Sa component is $BaCO_3$ powder, Na component is $Na_2CO_3$ powder, K component is $K_2CO_3$ powder, and Li component is $Li_2Co_3$ powder) which are to be the component sources for Si, Al, B, Zn, Ba, Ma, K, and Li respectively are mixed so as to obtain a predetermined composition. Subsequently, the mixture is melted at a temperature, for example, 1000 to 1500° C. The melt is then poured into the water and rapidly cooled for vitrification, The vitrified matter is then roughly pulverized into a roughly ground glaze (glaze frit) as a glaze composition.

The roughly ground glaze (glaze composition) is finely ground in a finely grinding (pulverizing) process into a glaze powder. According to the invention, the particles of the glaze powder obtained in the fine grinding process is processed to have an elution-suppressing coating layer. Namely, the surface of the grazing powder is covered with the elution-suppressing coating layer (hereinafter referred to simply as "coating layer") in order to prevent the elution of the water soluble component contained in the glaze. The coated glaze powder is used to prepare a later mentioned glaze slurry. According to the embodiment, the glaze layer 2d contains a high amount of water soluble components such as B, P, Li, K and Na, totally about 30 to 60 mol % in terms of oxide. With formation of the coating layer, the water soluble components will not be easily elude into the water solvent in the slurry. The viscosity of the slurry may, therefore, be effectively prevented from being increased as the time-passing. As a result, the coat thickness of glaze slurry may be easily and appropriately adjusted, and the possible variation in the coat thickness may be reduced Thus the glaze layer 2d having the level of the above mentioned thickness and roughness may be easily obtained, and simultaneously the flashover resistance property may be enhanced.

The coating procedure will be described in detail.

FIG. 1 shows a flow of the coating process as represented in sketches. According to the invention, the fine grinding of the roughly ground glaze is performed by way of a dry-pulverization. Namely as shown in FIG. 1a, the roughly ground glaze and grinding media (for example, the ceramic balls of alumina, silicon nitride, zirconia) are thrown into a grinding vessel. As shown in FIG. 1-b, the roughly ground glaze is ground by way of a dry ball mill without using the solvent until the average particle diameter becomes approximately 5 to 45 $\mu$m, thereby to obtain a finely ground glaze powder. With this procedure, the water soluble component may be prevented from elution at the time of crushing. Instead of the dry ball mill grinding, a jet mill grinding may be used where the roughly ground particles are driven to collide with one another by a gas flowing at high speed.

Figure 1A:
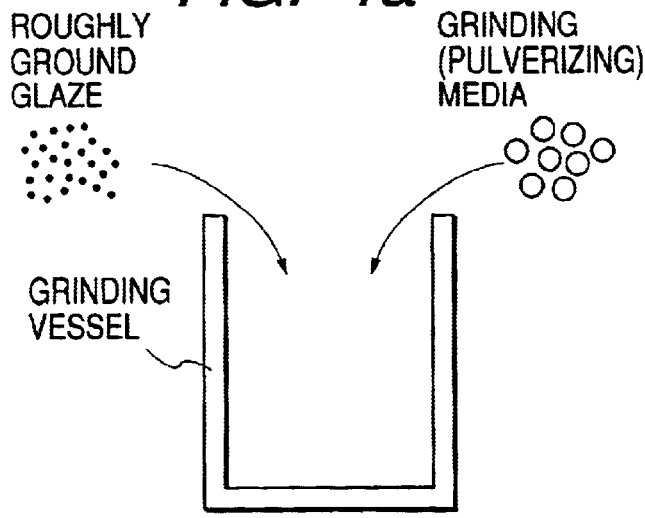
[FIG. 1 (FIGS. 1a to 1e)]
Figure 1B:
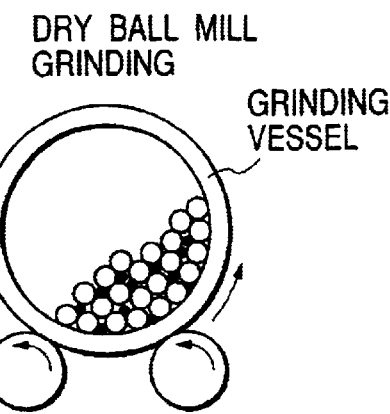
Figure 1C:
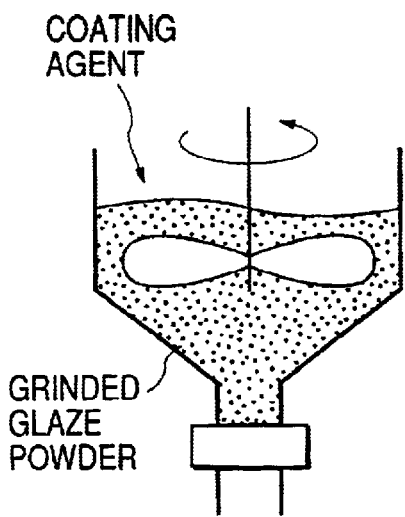
Figure 2:
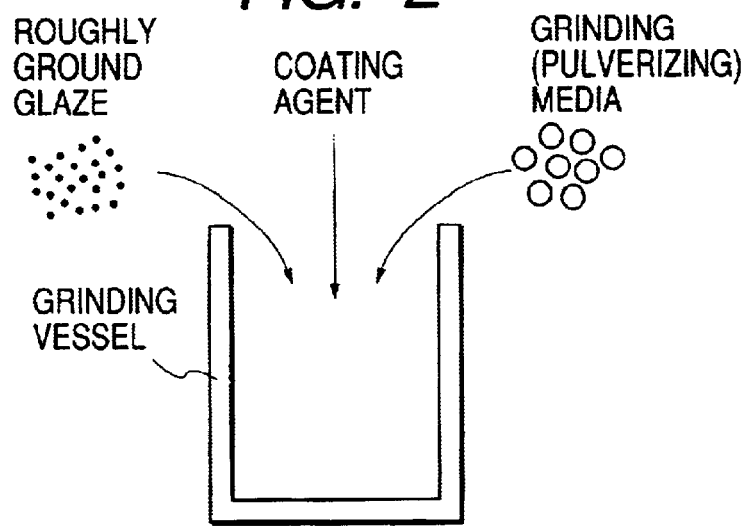

After the finely grinding procedure is finished, as shown in FIG. 1c, the glaze particles are formed with a coating layer for preventing elution of the water soluble component. According to the invention, the obtained finely ground glaze powder and a predetermined amount of the coating agent are thrown into the mixing vessel (herein, a propeller type agitator is used for mixing, and other known mixers may be used such as a rocking mixer, or a V-type mixer) and are agitated to perform the coating. With the coating performed after finely grinding, a probability may be reduced that an unnecessary chemical reaction is produced between the coating agent and the glaze powder. However, if it may be considered that the influence of the chemical reaction is little, as shown in FIG. 2, the coating agent for forming the elution-suppressing coating layer may be mixed to the glaze composition prior to starting of the fine grinding, and then the fine grinding is performed. Thus, with the simultaneous progress of the fine grinding of the glaze composition and coating of the coating agent, the number of processes may be saved. In FIG. 2, when pulverizing the dry ball mill, the roughly ground glaze and coating agent are together thrown into the grinding vessel. The coating agent for forming the elution-suppressing coating layer may be mixed to the glaze composition after starting the fine grinding while the glaze composition is finely ground so that the fine grinding of the glaze composition and the coating agent may be simultaneously coated in continuation of the grinding operation. For example, the coating agent itself may function as a grind assistant agent to promote the process of finely grinding operation and may contribute to reduce the glaze composition into fine particles in a short period of time. What is more effective is that the finely grinding operation may be performed without adding the coating agent until the particles come to some degree of roughness and the coating agent may be added after that and the grinding operation is continued together with the coating operation while the grind promoting function is involved. In this case, for performing a uniform and firm coating, when finishing the fine grinding, the grinding energy (for example, pot rotation speed and media agitating speed) may be lowered to stop or restrain the progress of grinding operation while the mixing or agitating operation is continued for coating. At this time, the coating agent may be newly added in continuation of the mixing or agitating operation. In the finely grinding operation, the grind assistant agent which will not function as a coating agent may be added to the glaze composition. On the other hand, in case the grind promoting effect is not expected, a coating agent which will not function as a grind assistant agent may be used.

Figure 3:
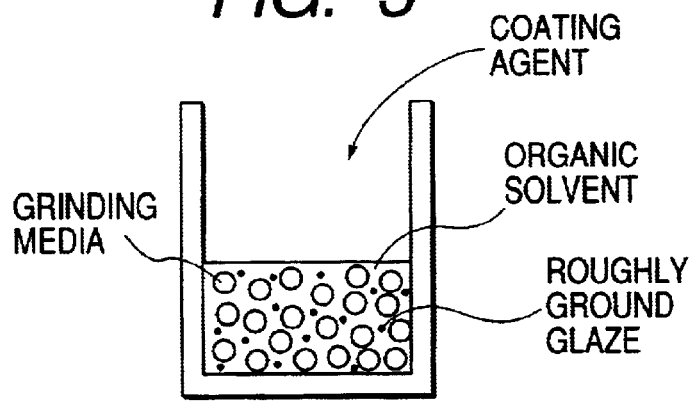

Further, if the elution of the water soluble component may be avoided during grinding, a wet-grinding procedure may be used instead of the dry-grinding. For example, as shown in FIG. 3, the finely grinding operation may be performed by the wet grinding procedure using an organic solvent (for example, alcohol (for example, methanol or propanol), ketone (acetone, or methyl ethyl ketone), hydrocarbon based solvent (toluene, or cyclohexene). In this Figure, a ball mill grinding is employed by use of the organic solvent.

Figure 4:
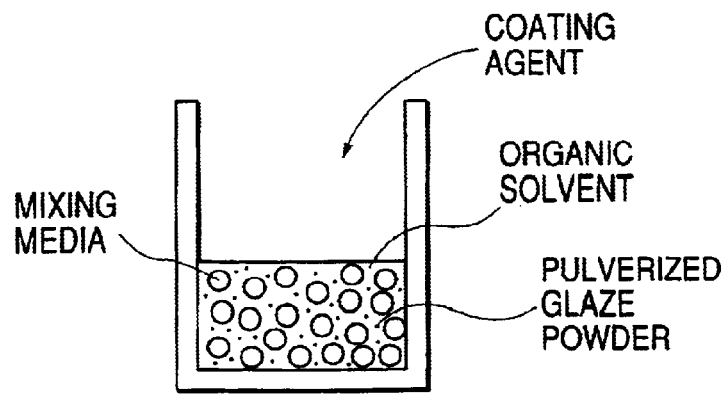

If the wet-grinding procedure is employed by use of the organic solvent in the finely grinding process, an agent soluble in the organic solvent may be used as a coating agent and the organic solvent is evaporated by Henshell mixer after the finely grinding operation is finished. In this way, the coating agent may be uniformly supplied as a solvent to the surface of the glaze particles, and more uniformed coating may be obtained. Further, the same coating may be obtained in the way as shown in FIG. 4, where the mixing is performed with addition of an organic solvent having a coating agent dissolved in the finely ground powder. Herein, the coating is performed by the ball mill mixture using a mixing media.

The elution-suppressing coating layer may be rendered to be the organic coating layer which has a water solubility lower than that of the glaze and is evaporated or decomposed at glaze-baking, the residues and bubbles of the coating agent may be reduced at the glaze layer 2d after glaze-baking. As a result, the glaze layer 2d of excellent voltage resistance may be obtained.

Such an organic coating layer may be formed as a substance containing, for example, a coupling agent layer for contacting the surface of glaze particles. The coupling agent has a molecular structure having coexistence of an organic functional group and a group with high affinity to an inorganic material (the group which may be changed into a group of such high affinity by hydrolysis: hereinafter referred to as "inorganic affinity group"). The coupling agent adsorbs the surface of the organic material at the side of the inorganic affinity group (the glaze particle surface in case of the invention) while the organic functional group is arranged on the side of the coated surface and shows the high affinity to the organic material. As the inorganic affinity group contains a metallic atom (the metal includes silicon as a concept) which is principally an inorganic cation, the coupling agent may be a sort of the organic metal compound. In dependence upon sorts of the contained metallic atoms, the coupling agent may be various sorts of compounds which are silane based (so-called silane coupling agent), chromate based, titanate based (as one example, isopropylpoly isostearoyltitanate), aluminate based, zirconia based compounds. Any of the compounds may be used in the invention.

The coupling agent inherently exists, like the glass fiber reinforced plastics (FRP), at the interface between an organic material and an inorganic material and is used so as to increase the bonding strength of both materials. On the other hand, according to the invention, since the coating layer is formed for suppressing the elution of the component from the glaze particles, it is required that the surface of the coating layer has a proper hydrophobic property. From the view point, the coupling agent layer has a structure of the organic functional group arranged at the surface thereof, and the layer itself has a definite hydrophobic property. Therefore, as shown in FIG. 5a, it is possible to take a mode covering the surface of glaze particle with the single coupling agent layer. The mode is easy to perform and is preferred in the invention. On the other hand, for forming a more reinforced elution-suppressing coating layer, the outer side of the coupling agent layer may be coated with another high molecular material layer as shown in FIG. 5b.

Since the glaze contains silicon dioxide as the vitreous skeleton material, the coupling agent layer as preferably a silane coupling agent so as to increase the bonding strength in formation of a stabilized coating layer. The silane coupling agent has broadly been studied in the field of FRP as described above. It is one of the advantages that this agent may be cheaply available.

The silane coupling is represented by an general formula of $YSi(CH_3)_{3-n} Xn$. Y represents various sorts of organic functional groups. X represents a hydrolysis group such as an alkoxy group (for example, methoxy group and ethoxy group) and forms an inorganic affinity group together with Si. Y is, in the application field of FRP, is a functional group such as vinyl, methacryl, epoxy, amino, or mercaptol which have a specified affinity (or reactivity) per each of plastics as the object of bonding. According to the invention, any group may be available as far as it contains C which can give a definite hydrophobic property to the surface of the coating layer. In this sense, methyltrimetoxy silane, ethyltri metoxy silane where Y is rendered, for example, to be a methyl group or ethyl group, may be regarded to belong to the silane coupling agent.

FIG. 12 inferentially shows the mechanisms of silane coupling agent layer formed at the surface of the glaze particle. As shown in A, the silane coupling agent is rendered to a silanol compound having a silanol group (Si—OH) by hydrolysising a hydrolystic group X (Si—OR; R is, for example, alkyl group). This is, as shown B, further oligomerized with dehydrated condensation while the residual silanol group adsorbs the surface of the glaze under the condition of hydrogen bonging as shown in C, or as shown in D, forms a methalloxane bond (SiOM) with the metal or silicon atom (M) on the side of glaze. Thus, the silane coupling agent coating layer is considered to be formed as fixedly bonded.

Table 1 shows the examples of methoxy based silane coupling agents which is available in the invention. By the way, as shown in FIG. 5b, when the outer side of the silane coupling agent layer is covered with a high molecular material layer, each sort of the silane coupling agents may be the following preferred combination (the numerals surrounded in circles are group numbers in Table 1 and the meanings of the abbreviated marks are based on ISO 472 (1988):

① Unsaturated polyester, acryl, polyethylene;

② Unsaturated polyester, acryl, polystyrene, DAP, EPDM;

③ Epoxy, phenol, urethane, melamine;

④ Epoxy, phenol, urethane, melamine, polycarbonate, polyethylene, polyvinyl chloride, polyamide;

⑤ Epoxy, polyimide, phenol, melamine;

⑥ Epoxy, urethane, SBR;

⑦ Epoxy.

TABLE 1

| Chemical name | Chemical formula |
|---|---|
| ① Vinyltriethoxysilane | $CH_2=CHSi(OC_2H_5)_3$ |
| Vinyltris(2-methoxyethoxy)silane | $CH_2=CHSi(OC_2H_4OCH_3)_3$ |
| ② 3-methacryloxypropyltrimethoxysilane | $CH_2=C(CH_3)COOC_3H_6Si(OCH_3)_3$ |
| ③ 3-glycidoxypropyltrimethoxysilane | $CH_2\overset{O}{-}CHCH_2OC_3H_6Si(OCH_3)_3$ |
| 2-(3,4epoxycyclohexyl)-ethyltrimethoxysilane | (epoxycyclohexyl)–$CH_2=CH_2Si(OCH_3)_3$ |
| ④ N-2-(aminoethyl)3-aminopropyltrimethoxysilane | $H_2NCH_2CH_2NHC_3H_6Si(OCH_3)_3$ |
| N-2-(aminoethyl)3-aminopropylmethyldimethoxysilane | $H_2NCH_2CH_2NHC_3H_6Si(CH_3)(OCH_3)_2$ |
| 3-aminopropyltriethoxysilane | $H_2NC_3H_6Si(OC_2H_5)_3$ |
| ⑤ N-phenyl-3-aminopropyltrimethoxysilane | $C_6H_5$–$NHC_3H_6Si(OCH_3)_3$ |
| ⑥ 3-mercaptopropyltrimethoxysilane | $HSC_3H_6Si(OCH_3)_3$ |
| ⑦ 3-chloropropyltrimethoxysilane | $ClC_3H_6Si(OCH_3)_3$ |

Further, Table 2 shows the examples of ethoxy based silane coupling agents which is available in the invention. Since the ethoxy based coupling agent is of a higher hydrolytic rate than that of the methoxy based substance, it has an advantage in the point of long preservation. Table 3 shows the examples of various improved polymerising silane coupling agents which are effective for coating (product names of Tables 2 and 3 are of Shinetu Chemical Industry Ltd.).

TABLE 2

| Product name | Structural formula |
|---|---|
| KDE-403 | $(C_2H_5O)_3Si$—$(CH_2)_3$—$O$—$CH_2CH\overset{O}{-}CH_2$ |
| KBE-402 | $(C_2H_5O)_3Si(CH_3)$—$(CH_2)_3$—$O$—$CH_2CH\overset{O}{-}CH_2$ |
| KBE-503 | $(C_2H_5O)_3Si$—$(CH_2)_3$—$O$—$C(=O)$—$C(CH_3)=CH_2$ |
| KBE-603 | $(C_2H_5O)_3Si$—$(CH_2)_3$—$NH$—$(CH_2)_2$—$NH_2$ |
| KBE-903 | $(C_2H_5O)_3Si$—$(CH_2)_3$—$NH_2$ |

TABLE 3

| Product name | Structural formula |
|---|---|
| KBM-1003 | $(CH_3O)_3Si$—$CH=CH_2$ |
| KBM-1063 | $(CH_3O)_3Si$—$(CH_2)_4$—$CH=CH_2$ |
| KBM-1103 | $(CH_3O)_3Si$—$(CH_2)_8$—$CH=CH_2$ |

TABLE 3-continued

| Product name | Structural formula |
|---|---|
| KBM-1203 | $(CH_3O)_3Si$—$(CH_2)_3$—$O$—$CH=CH_2$ |
| KBM-1303 | $(CH_3O)_3Si$—$(CH_2)_{10}$—$C(=O)$—$O$—$CH=CH_2$ |
| KBM-1403 | $(CH_3O)_3Si$—$C_6H_4$—$CH=CH_2$ |
| KBM-503 | $(CH_3O)_3Si$—$(CH_2)_3$—$O$—$C(=O)$—$C(CH_3)=CH_2$ |
| KBM-5102 | $(CH_3O)_3Si(CH_3)$—$(CH_2)_3$—$O$—$C(=O)$—$CH=CH_2$ |
| KBM-5103 | $(CH_3O)_3Si$—$(CH_2)_3$—$O$—$C(=O)$—$CH=CH_2$ |
| KBM-5403 | $(CH_3O)_3Si$—$(CH_2)_3$—$O$—$(CH_2)_2$—$O$—$C(=O)$—$C(CH_3)=CH_2$ |

Further, the organic coating layer which is in contact with the surface of the glaze particle is an organic silicon compound layer or a polyether compound layer. The silane coupling agent is one of the organic silicon compounds. If the organic silicon compound is used, the silicon component may remain in the glaze layer without being evaporated when glaze-baking. However, since the silicon itself is one of the glaze components, the obtained glaze layer will not be functionally deteriorated.

Figure 13:
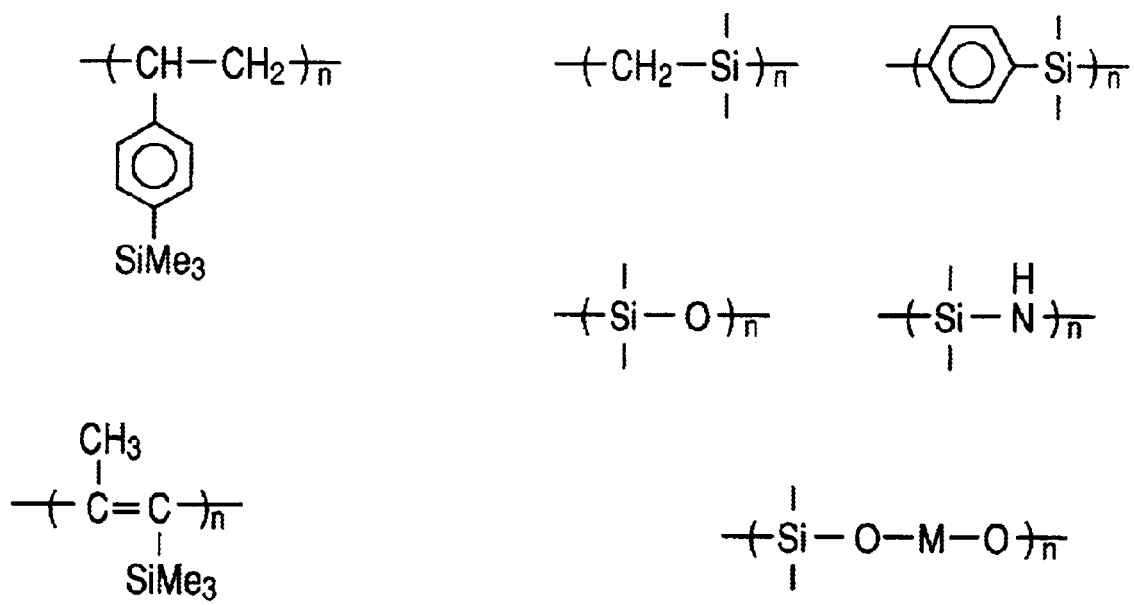
Figure 14:
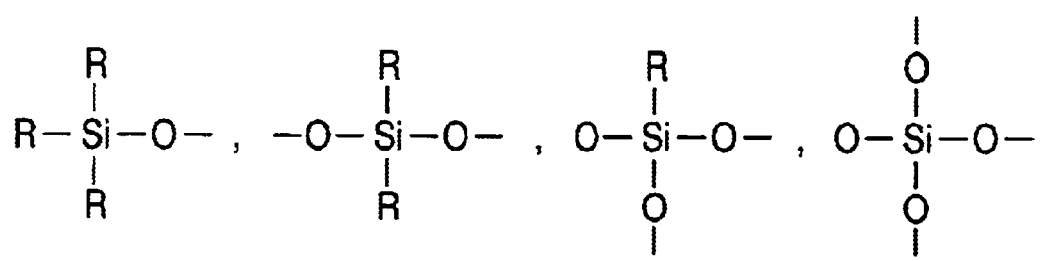

If the organic compound other than the silane coupling agent which is functionally differentiated with the organic functional group and the inorganic affinity group has C of hydrophobic property (organic affinity) and O of inorganic affinity coexisting in the molecule thereof, the affinity (coating property) with the glaze particle surface of coating layer and the water permeability (elution preventing property) may be compatible. As such matters, various silicon containing polymers may be exemplified as shown in FIG. 13. Particularly, the high molecular materials generally called as polysiloxane (polyorganosiloxane) are normally called as silicone (namely, the organic silicon compound layer is rendered to be a silicone coating layer), and are excellent in easy formation of coating layer and in elution preventing effect of water soluble component and are also easily available. Silicone has a molecule basically composed of a combination of four sorts of siloxane units as shown in FIG. 14. In dependence upon the combination and the sort of the functional group R, the silicones of various compositions may be employed such as silicone resin (called silicone varnish as diluted with organic solvent after bridge forming reaction), silicone rubber, or silicone oil.

Further, as an organic compound having C and O coexisting therein, there is the polyether compound as mentioned above. Specifically, there may be exemplified polyethylene oxide, polyethylene glycol, polypropylene oxide, and polypropylene glycol. Particularly, the coating layer using polyethylene oxide or polypropylene oxide is excellent in the elution preventing effect and may be preferably used in the invention.

The high molecular material layer of high molecules having C and Si or O coexisting therein may be directly formed at the glaze particle surface without intervention of a coupling agent layer as shown in FIG. 5c.

In preparation of the coated glaze particle, it is preferable that the adding amount of the coating agent is 0.01 to 2 mass % to the glaze composition for forming the elution-suppressing coating layers If being less than 0.01 mass %, the coating layer will not show a sufficient effect for suppressing the elution of the water soluble component. If exceeding 2 mass %, the coated glaze particle is not be sufficiently dispersed in the slurry, and the sunk down particles will cause separation of the slurry. Further, in case the silane coupling agent is used, if the adding amount exceeds 2 mass %, silane will be excessively olygomerized and the coating activity will be lost. A desirable coating condition is not be obtained. More preferably, the adding amount of the coating agent to the glaze composition is 0.5 to 2 mass %.

Turning back to FIG. 1, as shown in D, after formation of the elution-suppressing coating layer at the particles of glaze powder, the coated glaze particle may be heat-treated at a temperature in the range of 100 to 300° C. With such heat treatment being performed, the coating layer may be formed more firmly and may more effectively restrain the elution of the glaze into the slurry. If the heat treating temperature is less than 100° C., the effect is not sufficient. If the heat treating temperature exceeds 300° C., the coating layer may be decomposed and the effect may be detracted adversely.

Figure 7:
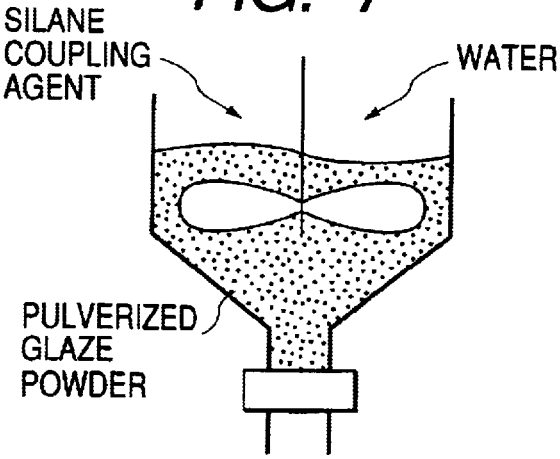

Such heat treatment will, in case the coating agent contains a solvent, cause the solvent to evaporate to promote a formation of fine and close coating, thereby to enhance the elution suppressing effect. On the other hand, in case an organic coating layer is formed as the silane coupling agent layer, it is effective, as shown in FIG. 7, to add to the glaze powder a silane coupling agent and a proper amount of water to oligomerize the former and mix them (amount of water is, of course, of a degree not to invite the excessive elution of the glaze component). In FIG. 7, the finely ground glaze powder is used. However, in case the finely grinding process and coating process are simultaneously operated, the silane coupling agent and the water are added at the step of finely crushing. In this case, the heat treatment may be performed as a drying process after coating. With this heat treatment, the oligomerized coating layer of silane coupling agent will be more reinforced and excellent in elution preventing property.

Figure 6:
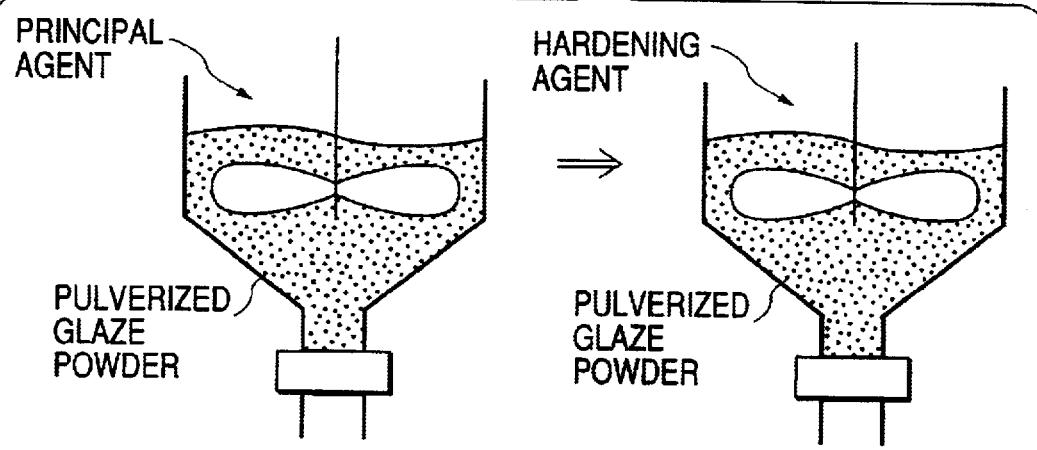

Further, the organic coating layer may be used as a two fluid mixture type by forming the organic coating layer while containing the high molecular material layer which is formed with a coating agent comprising liquid principal agent and hardening agent (for example, silicone resin such as silicone RT or silicone rubber). In this case, in order to perform the uniformed coating, it is effective to add the principal agent to the glaze powder and mix them, and then to mix them further with addition of the hardening agent as shown in FIG. 6. In this case, the heat treatment may be performed after addition of the hardening agent. With polymerization (or bridge formation) promoting effect of high molecular materials, the coating layer may be more reinforced and excellent in the elution preventing property.

Figure 1E:
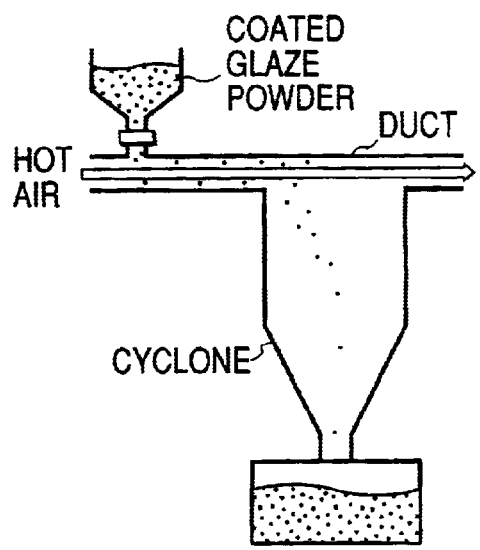
Figure 1D:
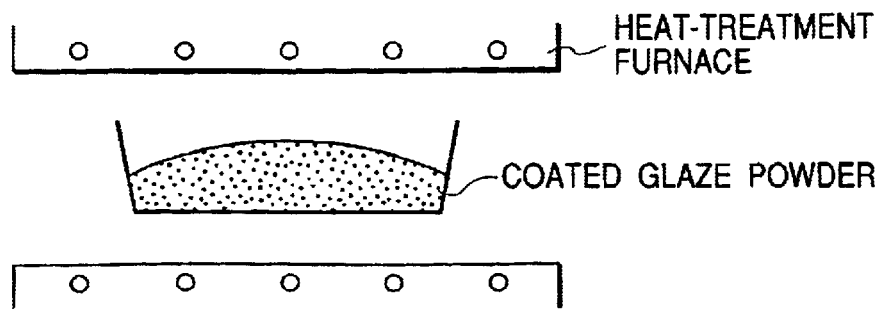

Further as shown in FIG. 1d, the heat treatment may be performed by use of a rotary kiln, and besides, as shown in FIG. 1e, a hot-air drying method may be employed, where the coated glaze powder is driven to flow together with hot air through a duct and is collected by use of a cyclone.

Figure 8:
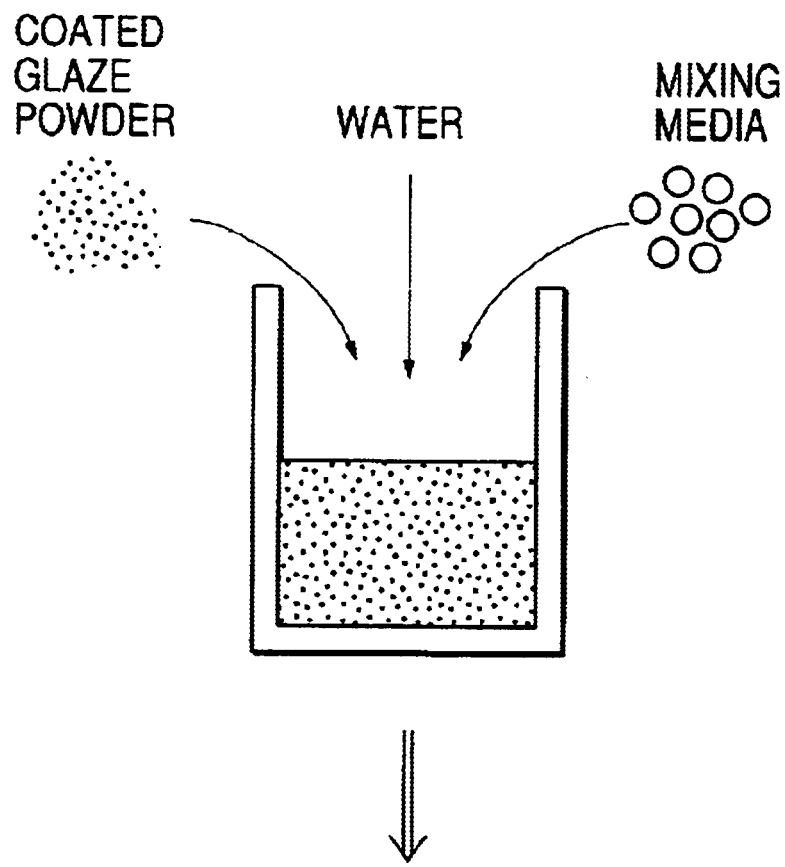
Figure 8:
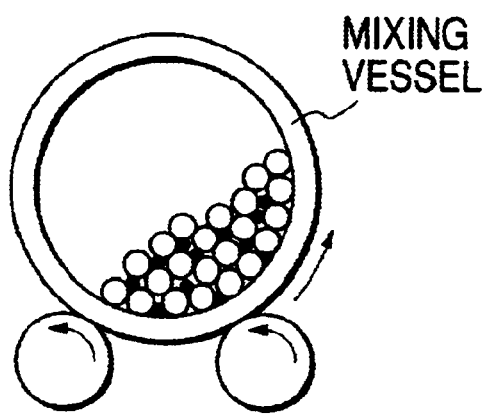

The thus obtained coated glaze powder is mixed with a proper amount of the clay mineral such as kaolin, gairome clay and an organic binder, and further as shown in FIG. 8, is mixed with the water solvent (for example, industrial pure water) so as to obtain a glaze slurry. According to the embodiment in. FIG. 8, the coated glaze powder and the water are thrown into the mixing vessel together with the mixing media so as to be rendered to be the slurry while the ball mill is used to promote dissolution of coherent particles.

Figure 9:
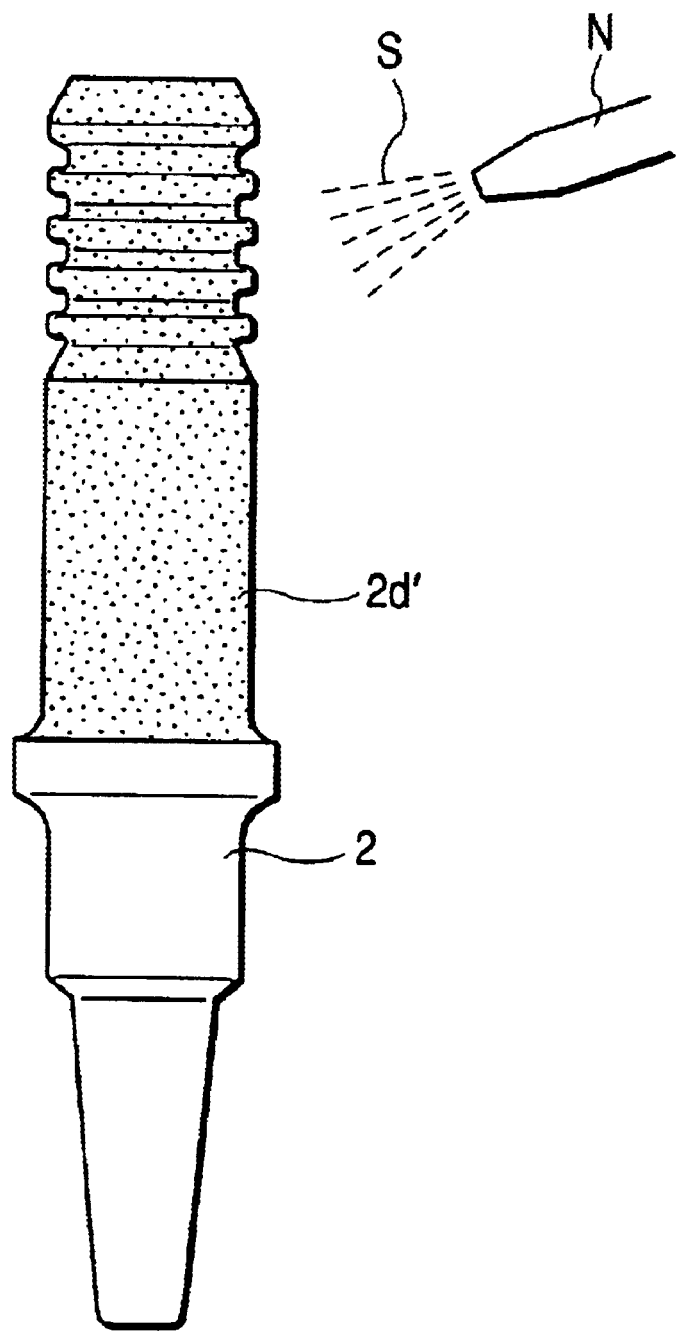
Figure 10:
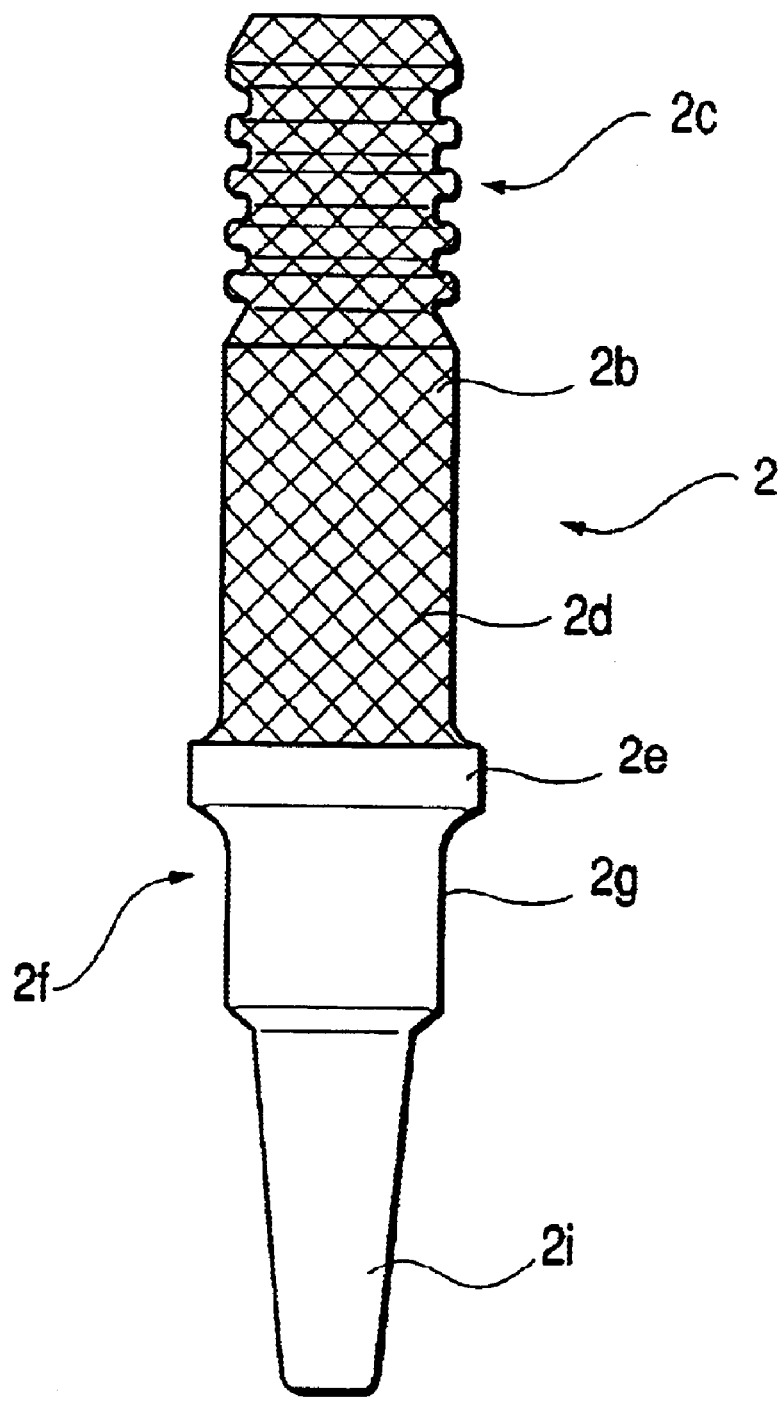

As shown in FIG. 9, the glaze slurry is sprayed from a spray nozzle N to the required surface of the insulator 2 to form a glaze slurry coated layer 2d as a glaze powder piled layer and is then dried. By subsequent glaze-baking, the glaze slurry coated layer 2d becomes the glaze layer 2d as shown in FIG. 10. The glazed insulator 2 thus obtained has the metal shell 1, and the earth electrode 4 assembled thereto and the spark plug 100 is finished up as shown in FIG. 11.

EXAMPLES

For confirming the effects of the invention, the experiments were made as described below:

The insulator 2 of sintered alumina ceramics of the shape as shown in FIG. 9 was produced in a normally available method. Subsequently the glaze slurry was prepared as follows; As materials, $SiO_2$ powder (purity 99.5%), $Al_2O_3$ powder (purity 99.5%), $H_3BO_3$ powder (purity 98.5%), ZnO powder (purity 99.5%), $BaCO_3$ powder (purity 99.5%), SrO powder (purity 99.5%), $Na_2CO_3$ powder ((purity 99.5%), $K_2CO_3$ powder (purity 99%), $Li_2CO_3$ (purity 99%), $MoO_3$ powder (purity 99%), $Fe_2O_3$ powder (purity 99%), $ZrO_2$ powder (purity 99.5%), $TiO_2$ powder (purity 99.5%), $CaCO_3$ (purity 99.8%), MgO powder(purity 99.5%), $Bi_2O_3$ powder (purity 99%) were mixed so that various compositions may be provided such as A, B, C and D as shown in Table 4. Then the mixtures were melted at the temperature 1000 to 1500° C. and the melts were poured into water and rapidly cooled for vitrification.

TABLE 4

| | Glaze composition (mol %) | | | |
|---|---|---|---|---|
| | A | B | C | D |
| $SiO_2$ | 36.5 | 36.0 | 36.5 | 30.0 |
| $Al_2O_3$ | 1.0 | 1.0 | 1.0 | 0.5 |
| $B_2O_3$ | 31.0 | 47.0 | 31.0 | 55.0 |
| $Na_2O$ | 1.0 | 1.0 | 5.5 | 1.0 |
| $K_2O$ | 4.5 | 2.5 | 7.0 | 2.5 |
| $Li_2O$ | 2.0 | 2.0 | 6.0 | 2.0 |
| BaO | 4.5 | 5.5 | 5.5 | 3.5 |
| SrO | | 1.0 | 1.0 | |
| ZnO | 13.0 | 4.0 | 4.0 | 4.0 |
| $MoO_3$ | 1.0 | | | 0.5 |
| $Fe_2O_3$ | | | 0.5 | |
| CaO | 2.0 | | | |
| $ZrO_2$ | 1.0 | | | 1.0 |
| $TiO_2$ | 0.5 | | | |
| $Bi_2O_3$ | 2.0 | | 2.0 | |
| MgO | | | | |
| Total | 100 | 100 | 100 | 100 |

The vitrified mixtures were dry-ground into particles of diameter 50 μm or less, that is, into a finely ground glaze powder by means of the alumina pot ball mill. Subsequently, with the sorts and mixing amount as shown in Tables 5 to 7, various organic silicon compounds (silane coupling agent, or silicone based high molecular material), titanate based coupling agent or polyether were thrown into the pot as a coating agent and mixed for 60 minutes and heat-treated for 30 minutes at different temperatures as required. Subsequently, 3 parts by weight of New Zealand kalion as a clay mineral and 2 parts by weight of PVA as an organic binder were mixed into 100 parts by weight of the glaze frit, and further kneaded with addition of 100 parts by weight of the water, thereby to prepare the glaze slurry. For comparison, another slurry was prepared which was non-coated particles (No. 7) The obtained slurries were measured regarding the. viscosity immediately after preparation and after 10 days storage at the temperature 55° C. The viscosimeter used was the B (BH) type (made by Tokyo Keiki) with a rotor of a diameter 47 mm and the thickness 1.5 mm. The rotation speed was 20 rpm and the viscosity indicating value was recorded after 30 seconds from initiation of rotation.

The glaze slurry was sprayed to the surface of the insulator 2 by means of the spray nozzle and then was dried to form the glaze slurry coated layer. Further, the insulator 2 was additionally prepared which was dripped into the bath in which the glaze slurry was thrown and then pulled up to form a glaze layer at the surface thereof. The coat thickness of glaze was about 100 μm after dried. By use of the insulator 2, various types of spark plugs 100 as shown in FIG. 11 were produced. The outer diameter of screw portion 7 was 14 mm.

Subsequently, the surface roughness was measured at the surface of the glaze layer 2d at the periphery of the base portion of the insulator 2 and with respect to the maximum height in accordance with the method as prescribed in JIS:B0601. The measuring instrument used was a non-contact three dimensional measuring instrument (NH-3) of Mitaka Kouki Industry Ltd. The film thickness of the glaze layer 2d at the outer periphery of the base of the insulator 2 was measured by way of SEM observation.

As to the spark plugs 100, for preventing a discharge on the side of spark discharge gap g, the forward end portion of the insulator 2 was covered with a silicon tube while the spark plug 100 was attached to the pressure chamber and the body portion 2b of the insulator 2 was covered with a rubber cap RC of silicon rubber as shown in FIG. 11 and a high voltage lead wire, the outer periphery of which was isolated with a vinyl, was connected to the terminal metal fixture 13. In this condition, the spark plug 100 was supplied with voltage through the lead wire while the ignition voltage level was increased at the rate of 0.1 to 1.5 kv/sec, and thus the threshhold voltage causing a flashover phenomenon was measured. The results are shown in Tables 5 to 7.

TABLE 5

| | No. | | | | | |
|---|---|---|---|---|---|---|
| | 1 | 2 | 3 | 4 | 5 | 6 |
| | Glaze composition | | | | | |
| | A | B | C | D | E | E |
| Coupling agent Organosilicon compound | Methyl-trimethoxy-silane 0.5% — | Methyl-trimethoxy-silane 0.3% Methyl-trimethoxy-silane 0.2% | Methyl-trimethoxy-silane 0.5% — | Methyl-trimethoxy-silane 0.5% — | Ethyl-trimethoxy-silane 1.0% Dimethyl silicone oil 0.7% | Ethyl-trimethoxy-silane 1.0% Dimethyl silicone oil 0.7% |
| Polyether | — | — | — | — | — | — |
| Heat treatment | None | None | None | None | None | None |
| Appearance {graze-burned state} | O | O | O | O {Slightly shriveled} | O | O |
| Surface roughness Ry {difference between surface top and bottom} | 3.0 μm | 5.0 μm | 5.0 μm | 9.0 μm | 4.0 μm | 6.0 μm |
| Glaze layer thickness | 20 μm | 35 μm | 35 μm | 50 μm | 35 μm | 35 μm |
| FO resistance | 38 kV | 34 | 30 | 28 | 32 | 30 |

TABLE 5-continued

|  | No. | | | | | |
|---|---|---|---|---|---|---|
|  | 1 | 2 | 3 | 4 | 5 | 6 |
|  |  |  |  | Glaze composition | | |
|  | A | B | C | D | E | E |
| Initial glaze viscosity {mPa · s} at moisture of 40% | 100 | 150 | 150 | 300 | 100 | 200 |
| Viscosity as time-passing {mPa · s} at moisture of 40% and temperature of 55° C. after 10 days | 250 | 300 | 350 | 600 | 250 | 400 |
| Remarks |  |  |  |  |  |  |

TABLE 6

|  | No. | | | | |
|---|---|---|---|---|---|
|  | 7* | 8 | 9 | 10 | 11 |
|  |  |  | Glaze composition | | |
|  | B | B | B | B | B |
| Coupling agent |  |  | Isopropylpoly isostearoyl-titanate |  |  |
| Organosilicon compound | — | Methyltrimethoxysilane 0.3% | | | Ethyltrimethoxysilane 0.5% |
|  | — | Methyl silicon vanish 0.2% |  |  | Dimethyl silicone oil 0.2% |
| Polyether | — |  |  | Polyethylene oxide 0.3% | Polypropylene oxide 0.1% |
|  | — |  |  |  |  |
| Heat treatment | — | None | None | None | None |
| Appearance {graze-burned state} | O {With uneven layer thickness} | O | O | O | O |
| Surface roughness Ry {difference between surface top and bottom} | 2.5 μm | 3.0 μm | 4.0 μm | 5.0 μm | 4.0 μm |
| Glaze layer thickness | 80 μm | 25 μm | 40 μm | 40 μm | 30 μm |
| FO resistance | 16 | 38 | 32 | 32 | 36 |
| Initial glaze viscosity {mPa · s} at moisture of 40% | 2000 | 100 | 150 | 150 | 200 |
| Viscosity as time-passing {mPa · s} at moisture of 40% and temperature of 55° C. after 10 days | Measurement impossible | 150 | 350 | 300 | 350 |
| Remarks | The cap cannot be smoothly removed and mounted. The glaze cannot be stored for a long time. |  |  |  |  |

TABLE 7

|  | No. | | | | |
|---|---|---|---|---|---|
|  | 12 | 13 | 14 | 15** | 16*** |
|  |  |  | Glaze composition | | |
|  | B | B | B | B | B |
| Coupling agent |  |  |  |  |  |
| Organosilicon compound | Methyl-trimethoxy-silane 0.5% | Vinyl-chloro-silane 0.01% | Methyl-trimethoxy-silane 0.3% | Methyl-trimethoxy-silane 2.5% | Methyl-trimethoxy-silane 0.3% |
|  | — | Methyl-trimethoxy- | Methyl-trimethoxy- | Methyl silicon vanish | Methyl silicon vanish |

TABLE 7-continued

| | No. | | | | |
|---|---|---|---|---|---|
| | 12 | 13 | 14 | 15** | 16*** |
| | | | Glaze composition | | |
| | B | B | B | B | B |
| | | silane 0.2% | silane 0.2% Dimethyl silicone oil 0.2% | 1.5% | 0.2% |
| Polyether | | | | | |
| Heat treatment | Conducted {150° C.} | Conducted {150° C.} | Conducted {250° C.} | Conducted {150° C.} | Conducted {350° C.} |
| Appearance {graze-burned state} | O | O | O | Δ {Shriveled} | O |
| Surface roughness Ry {difference between surface top and bottom} | 3.0 μm | 3.0 μm | 4.0 μm | 8.0 μm | 7.0 μm |
| Glaze layer thickness | 20 μm | 25 μm | 30 μm | 30 μm | 40 μm |
| FO resistance | 40 | 38 | 34 | 26 | 30 |
| Initial glaze viscosity {mPa · s} at moisture of 40% | 100 | 100 | 150 | 150 | 250 |
| Viscosity as time-passing {mPa · s} at moisture of 40% and temperature of 55° C. after 10 days | 150 | 300 | 300 | 160 | 550 |
| Remarks | | | | Abnormal settling down | |

In view of the results, it is apparent that the glaze powder which was coat-treated shows a less viscosity of slurry and a less time elapse change as compared with the substance which was not coat-treated, and that the effect is more enhanced with the heat treatment. On the other hand, the glaze powder which was not coat-treated (No. 7) shows a viscosity which is near the threshold value for coating immediately after preparation of the slurry. After storage, the slurry was gelated and the viscosity measurement was incapable (upon further investigation by the inventors, it was apparent that the slurry viscosity began to be difficult to obtain a security of uniform glaze layer coating in case the viscosity exceeds 600 mPa·s). It is a matter of course that the coated slurry shows little uneven coating and good appearance and roughness of the glaze layer to be obtained, and the film thickness is within an allowable range. As a result, the threshold voltage showing the flashover resistance shows a high value. On the other hand, the slurry which was not coated shows an unevenness appearance, a bad surface roughness and an abnormal film thickness of the glaze layer. As a result, the rubber cap is not smoothly attached and detached and the threshold voltage showing the flashover resistant property shows a low value.

This application is based on Japanese Patent application JP 2001-135496, filed May 2, 2001, the entire content of which is hereby incorporated by reference, the same as if set forth at length.

What is claimed is:

1. A method for producing a spark plug, the spark plug comprising a center electrode, a metal shell and an alumina ceramic insulator disposed between the center electrode and the metal shell, wherein at least part of the surface of the insulator is covered with a glaze layer comprising oxides, the method comprising the steps of:
   preparing a coated glaze powder so that a surface of each particle of a glaze powder is covered by an elution-suppressing coating layer, the elution-suppressing coating layer suppressing an elution of water soluble component that is contained in each particle of the glaze powder;
   preparing a glaze slurry by suspending the glaze powder in a water solvent;
   applying the glaze slurry to a surface of the insulator so as to form a glaze powder-deposited layer; and
   baking the glaze powder-deposited layer to the surface of the insulator to form the glaze layer by heating the glaze powder-deposited layer.

2. The method according to claim 1, wherein the coated glaze powder-preparing step comprises:
   blending and mixing component powders of the glaze powder so as to obtain a predetermined composition;
   melting the mixture;
   rapidly cooling the melt for vitrification so as to obtain a glaze composition;
   pulverizing the glaze composition so as to obtain the graze powder; and
   forming the elution-suppressing coating layer at a surface of each particle of the glaze-powder after the pulverizing so as to obtain the coated glaze powder.

3. The method according to claim 2, wherein the pulverizing is conducted by way of a dry pulverizing.

4. The method according to claim 2, wherein the pulverizing is conducted by way of a wet pulverizing with use of an organic solvent.

5. The method according to claim 1, wherein the coated glaze powder-preparing step comprises:
   blending and mixing component powders of the glaze powder so as to obtain a predetermined composition;
   melting the mixture;
   rapidly cooling the melt for vitrification so as to obtain a glaze composition;
   pulverizing the glaze composition so as to obtain the graze powder; and
   introducing a coating agent for forming the elution-suppressing coating layer to the glaze composition before the pulverizing so that the pulverizing and applying of the coating agent to the glaze powder are conducted simultaneously.

6. The method according to claim 5, wherein the pulverizing is conducted by way of a wet pulverizing with use of an organic solvent.

7. The method according to claim 6, wherein the coating agent is soluble in the organic solvent and the coated glaze powder-preparing step further comprises:
dissolving the coating agent in the organic solvent before the pulverizing; and
evaporating the organic solvent after the pulverizing.

8. The method according to claim 5, wherein an amount of the coating agent is 0.02 to 2% by weight based on the glaze composition.

9. The method according to claim 1, wherein the coated glaze powder-preparing step comprises;
blending and mixing component powders of the glaze powder so as to obtain a predetermined composition;
melting the mixture;
rapidly cooling the melt for vitrification so as to obtain a glaze composition;
pulverizing the glaze composition so as to obtain the graze powder; and
introducing a coating agent for forming the elution-suppressing coating layer to the glaze composition while at least part of the pulverizing so that applying of the coating agent to the glaze powder is conducted simultaneously with the pulverizing.

10. The method according to claim 9, wherein the pulverizing is conducted by way of a wet pulverizing with use of an organic solvent.

11. The method according to claim 10, wherein the coating agent is soluble in the organic solvent and the coated glaze powder-preparing step further comprises:
dissolving the coating agent in the organic solvent at or after the introduction; and
evaporating the organic solvent after the pulverizing.

12. The method according to claim 9, wherein an amount of the coating agent is 0.02 to 2% by weight based on the glaze composition.

13. The method according to claim 1, wherein the elution-suppressing coating layer is less soluble to water than to the glaze and is an organic coating layer which is evaporated or decomposed at the time of the baking process.

14. The method according to claim 13, wherein the organic coating layer is formed as a coupling agent layer.

15. The method according to claim 14, wherein an outer side of the coupling agent layer is coated with high molecular material layer.

16. The method according to claim 13, wherein the organic coating layer is an organic silicon compound layer or a polyether compound layer.

17. The method according to claim 16, wherein the polyether compound layer is a coating layer comprising one of polyethylene oxide and polypropylene oxide.

18. The method according to claim 13, wherein the organic coating layer is a silane coupling agent layer.

19. The method according to claim 13, wherein the organic coating layer is a silicone coating layer.

20. The method according to claim 1, wherein the glaze layer comprises 30 to 60 mol % in total of at least one of B, P, Li, K and Na in terms of $B_2O_5$, $P_2O_5$, $Li_2O$, $K_2O$ and $Na_2O$, respectively.

21. The method according to claims 20, wherein the glaze further comprises 1 mol % or less of Pb in terms of PbO.

22. The method according to claim 1, further comprising a step of heating the coated glaze powder at a temperature of 100 to 300° C. after the coated glaze powder-preparing step.

23. The method according to claim 22, wherein the coating layer comprises a high molecular material layer that is formed with a coating agent of a double fluid mixing type, the coating agent comprising a fluid principal agent and a hardening agent, and the method further comprising the steps of:
mixing the principal agent with the glaze powder; and
mixing the mixture with the hardening agent before the heating step.

24. The method according to claim 22, wherein the coating layer is formed as a silane coupling agent layer and the method further comprises the steps of:
mixing the glaze powder with a silane coupling agent and water for olygomerize of the silane coupling agent before the heating step.

25. The method according to claim 1, wherein the insulator is formed with a projection part in an outer circumferential direction at an axially central position. thereof,
taking, as a front side, a side directing toward the front end of the center electrode in the axial direction, a cylindrical face is shaped in the outer circumferential face at the base portion of the insulator main body in the neighborhood of a rear side opposite the projection part, and
the outer circumferential face at the base portion is covered with the glaze layer, the glaze layer having a surface roughness wherein a maximum height ($R_y$) of which is 10 µm or less in accordance to the measurement prescribed by JIS:B0601.

26. A method for producing a spark plug, the spark plug comprising a center electrode, a metal shell and an alumina ceramic insulator disposed between the center electrode and the metal shell, wherein at least part of the surface of the insulator is covered with a glaze layer comprising oxides,
the method comprising the steps of:
preparing a coated glaze powder so that a surface of each particle of a glaze powder is covered by an elution-suppressing coating layer, the elution-suppressing coating layer suppressing an elution of soluble component that is contained in each particle of the glaze powder;
preparing a glaze slurry by suspending the glaze powder in a solvent;
applying the glaze slurry to a surface of the insulator so as to form a glaze powder-deposited layer; and
baking the glaze powder-deposited layer to the surface of the insulator to form the glaze layer by heating the glaze powder-deposited layer.

* * * * *